US006924576B2

(12) United States Patent
Zierer et al.

(10) Patent No.: US 6,924,576 B2
(45) Date of Patent: Aug. 2, 2005

(54) TRANSVERSE FLUX MACHINE, IN PARTICULAR A UNIPOLAR TRANSVERSE FLUX MACHINE

(75) Inventors: Gerald Zierer, Rastatt-Wintersdorf (DE); Guenter Kastinger, Gaggenau-Sulzbach (DE)

(73) Assignee: Robert Bosch GmbH, Stuttgart (DE)

( * ) Notice: Subject to any disclaimer, the term of this patent is extended or adjusted under 35 U.S.C. 154(b) by 45 days.

(21) Appl. No.: 10/455,480

(22) Filed: Jun. 6, 2003

(65) Prior Publication Data

US 2004/0046478 A1 Mar. 11, 2004

(30) Foreign Application Priority Data

Jun. 6, 2002 (DE) .......................... 102 25 156

(51) Int. Cl.⁷ .......................... H02K 19/18; H02K 1/06
(52) U.S. Cl. ....................... 310/217; 310/218
(58) Field of Search ........................ 310/217, 218, 310/254, 91; 29/596

(56) References Cited

U.S. PATENT DOCUMENTS

| | | | | |
|---|---|---|---|---|
| 4,864,176 A | * | 9/1989 | Miller et al. ............... | 310/194 |
| 5,006,748 A | * | 4/1991 | Wintermute ................ | 310/258 |
| 5,196,749 A | * | 3/1993 | Palma et al. ............... | 310/217 |
| 6,229,238 B1 | | 5/2001 | Graef | |
| 2002/0113520 A1 | | 8/2002 | Kastinger | |

FOREIGN PATENT DOCUMENTS

| | | |
|---|---|---|
| DE | 1 042 729 | 11/1958 |
| DE | 44 00 443 C1 | 11/1994 |

* cited by examiner

*Primary Examiner*—Burton S. Mullins
*Assistant Examiner*—Heba Elkassabgi
(74) *Attorney, Agent, or Firm*—Ronald E. Greigg (57) ABSTRACT

The invention proposes a transverse flux machine, in particular a unipolar transverse flux machine, with at least one stator module contained in a housing composed of two axially joined housing parts and having an annular coil disposed concentric to the housing axis as well as stator elements that embrace this annular coil from the outside and inside. For ease of assembly of the individual parts and for a precisely toleranced maintenance of a small air gap between the stator and the rotor, clamps that protrude axially from the respective housing parts oriented toward each other are provided for the stator elements and have positioning elements for securing them in the radial direction.

21 Claims, 6 Drawing Sheets

TRANSVERSE FLUX MACHINE, IN PARTICULAR A UNIPOLAR TRANSVERSE FLUX MACHINE

BACKGROUND OF THE INVENTION

1. Field of the Invention

The invention is directed to an transverse flux machine, in particular a unipolar transverse flux machine.

2. Description of the Prior Art

In a known unipolar transverse flux machine (DE 100 39 466 A1), the housing that contains the stator module is comprised of two identically designed half shells, which are placed against each other in mirror image fashion, with the stator module enclosed between them. Each half shell has a screen-like structure with an inner ring and a concentric outer ring, which are of one piece with each other and are connected to each other by means of radial fins. The half shells contain on the one hand, radial grooves to accommodate the stator yokes, which span the inner ring, radial fin, and outer ring, and on the other hand, radial grooves for the insertion of the stator fins, which span only the inner ring. In addition to these radial grooves, the two half shells that are placed against each other in mirror image fashion have opposing recesses that are disposed concentric to the housing axis and are for accommodating the annular coil of the stator module. The stator yoke and the radial grooves are matched to each other so that when the stator yokes and stator fins are inserted into the associated radial grooves, the two half shells of the housing are secured in a radially and axially stationary fashion. To this end, on both sides of their crosspiece, the stator yokes each have a hook protruding radially outward, which when the stator yoke is inserted into the radial groove, positively engages with a radial fin in the two half shells, at their rear end oriented away from the radial groove. At the end of each radial groove disposed in the outer ring, a radial recess is let into the groove bottom to accommodate the stator yokes and the radial depth of this radial recess is sized so that when the stator yoke is inserted into the radial groove in the proper position, the base of the hook comes into contact with the bottom of the recess. As a result, on the one hand, the stator yokes are positioned in a precisely toleranced fashion in the radial direction and on the other hand, the two half shells are clamped to each other axially.

OBJECTS AND SUMMARY OF THE INVENTION

The transverse flux machine or unipolar transverse flux machine according to the invention has the advantage over the prior art of a simple assembly through simple joining processes of the individual parts, which assures the maintenance of the particularly small air gap between the rotor and stator that is required in this kind of motor design.

According to an advantageous embodiment of the invention, the clamps protrude axially from radial plane surfaces of the housing parts that are oriented toward each other, and the radial leading edges of the stator elements are inserted into the clamps. Clamps that are designed in this way can easily be formed onto the housing parts by means of a simple injection mold formation when these parts are injection molded.

According to an advantageous embodiment of the invention, the corresponding positioning elements for radially position the stator elements are constituted by acute-angled notches in the radial leading edges of the stator elements and by acute-angled protuberances that engage positively in the notches and are disposed on the clamps provided on the housing parts.

According to a preferred embodiment of the invention, the annular coil is contained in a coil body that is provided with slots for the insertion of the stator elements. The slot width of the slots is greater than the thickness of the stator elements so that they are accommodated in the slots with a certain amount of play. The distance of the slots from one another in the circumferential direction corresponds to the spacing between the stator elements. These slots provided in the coil body permit the stator elements to be prepositioned on the annular coil during assembly so that by axially sliding the two housing parts onto the coil body, the stator elements are inserted with their radial leading edges into the associated clamps on the radial plane surfaces of the two housing parts, and after being pressed together with the two housing parts, are secured in an axially stationary fashion and are precisely positioned in the radial direction by means of the positioning elements. This prepositioning of the stator elements does not require the stator elements, which are usually comprised of a number of laminations, to be subjected to any bundling processes; they can instead be inserted loosely into the slots of the coil body.

According to an advantageous embodiment of the invention, in the housing, which is made of magnetically nonconductive material, the one housing part is cup-shaped, the other housing part is disc-shaped, and each housing part contains a central recess. Since for reasons of a reliable run-up of the transverse flux machine, usually at least two stator modules are disposed next to each other axially and are optionally rotated by 90° electrically in relation to each other, the two disc-shaped housing parts rest directly against each other with their disc surfaces oriented away from the clamps and are embraced by the cup-shaped housing parts of the two stator modules, with the circular ring-shaped cup edges of the cup-shaped housing parts contacting each other. This has the advantage that in a two-strand embodiment of the machine, the housing parts for the two stator modules can be produced identically and need only be rotated in relation to each other in order to produce a relative rotation angle position of 90° in relation to each other. If rotor modules of the machine disposed axially next to each other are already rotated by a rotation angle offset of 90° electrically in relation to each other, then the two disc-shaped housing parts of the stator modules can be joined together without being rotated and are held against each other when the two cup-shaped housing parts are attached to each other by an axial pressing force. Naturally the two disc-shaped housing parts can also be additionally connected to each other or can be of one piece with each other. The latter case, however, eliminates the above-described manufacturing advantage of identically embodied housing parts.

According to a preferred embodiment of the invention, the electrical supply to the two annular coils in the stator modules is disposed between the two disc-shaped housing parts in the form of a pressed screen. This makes it easier to route the electric coil connections from the two stator modules.

BRIEF DESCRIPTION OF THE DRAWINGS

The invention will be better understood and further objects and advantages thereof will become more apparent from the ensuing detailed description of preferred embodiments taken in conjunction with the drawings, in which.

DESCRIPTION OF THE PREFERRED EMBODIMENTS

Figure 1:
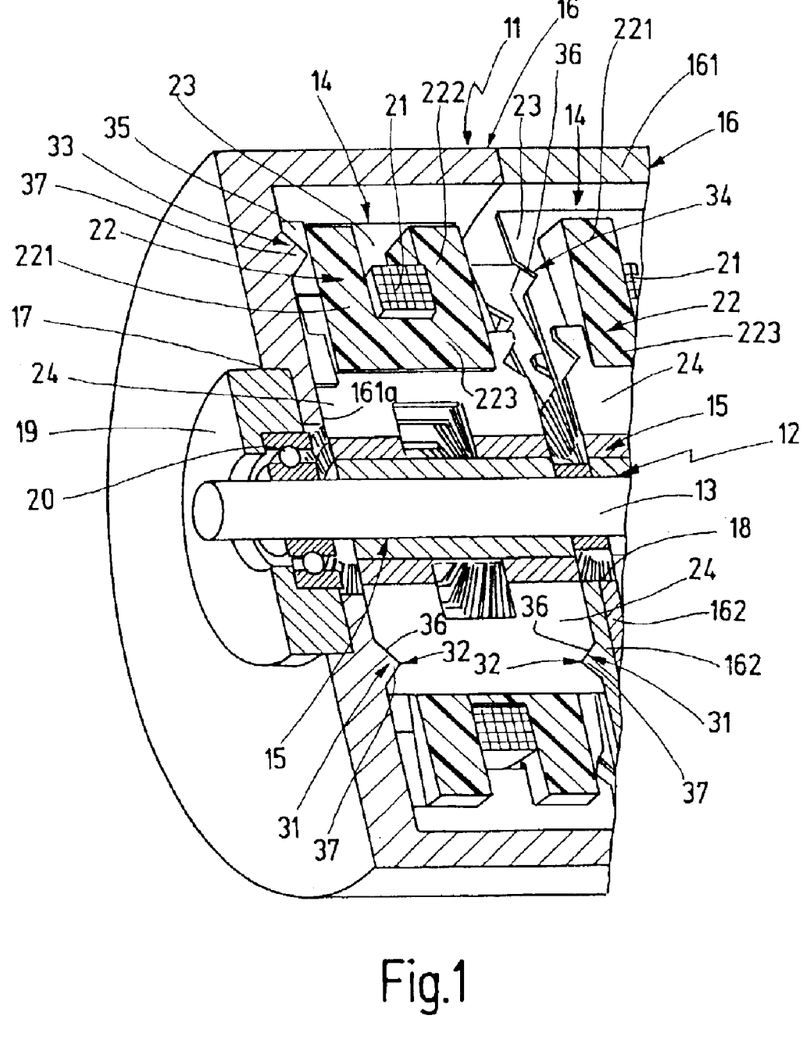
FIG. 1 shows part of a longitudinal section through a two-strand transverse flux machine, in a perspective depiction.
Figure 5:
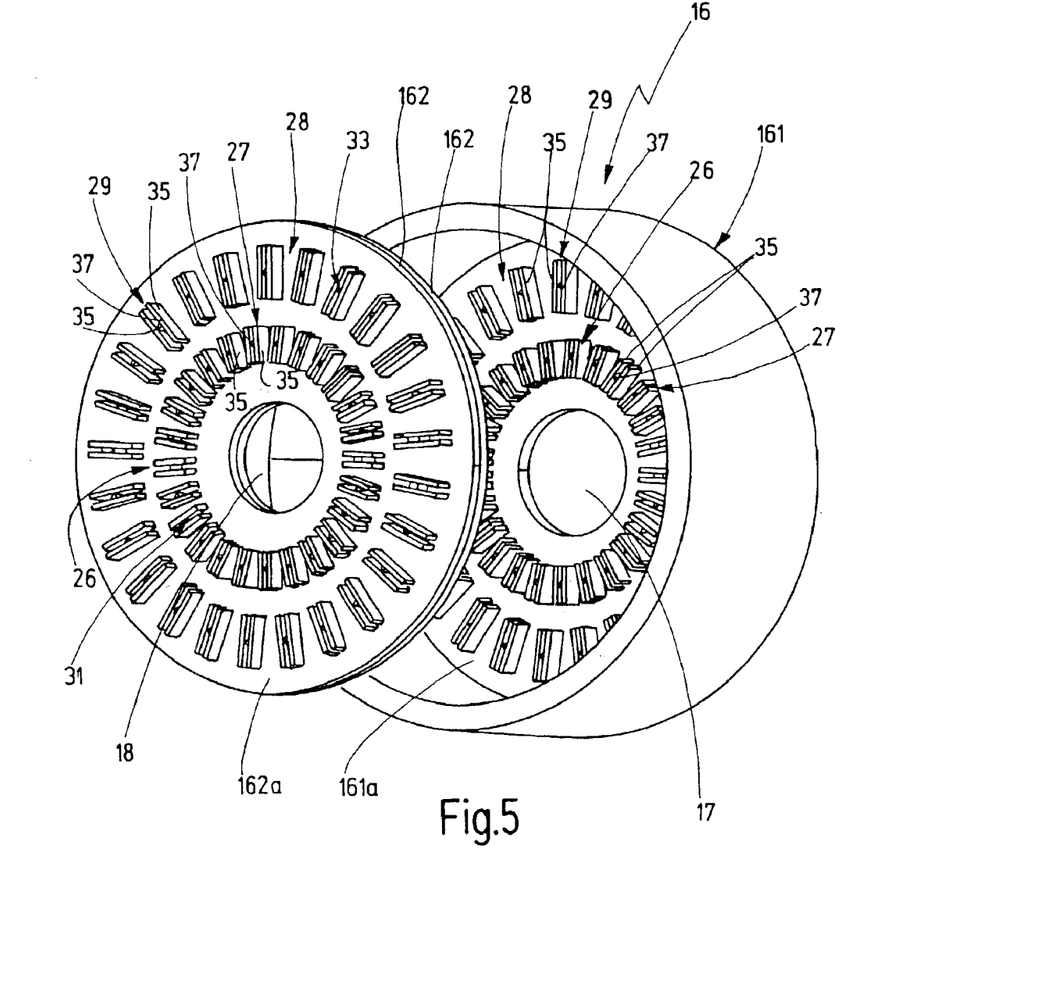
FIG. 5 shows an exploded view of the housing of the stator module that is disposed at the rear in FIG. 2.
Figure 6:
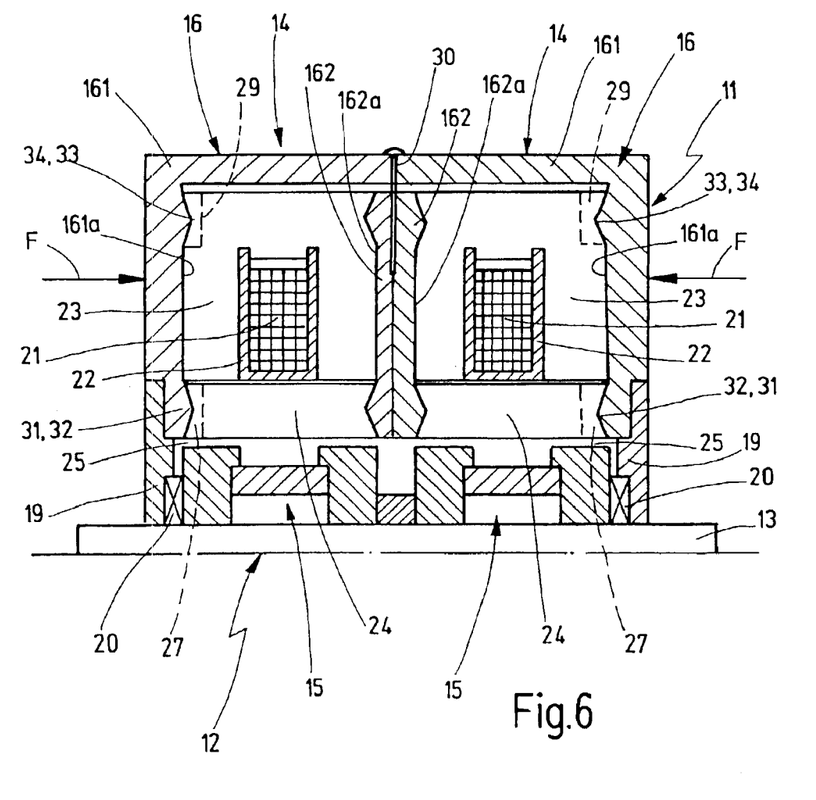
FIG. 6 is a longitudinal section through half of a two-strand unipolar transverse flux machine.

The transverse flux machine partly shown in FIG. 1 and the unipolar transverse flux machine partly shown in FIG. 6 each have a stator 11 and a rotor 12 that rotates in the stator 11 and is supported in a rotationally fixed manner on a rotor shaft 13. The stator 11 includes two stator modules 14 resting directly against each other in the axial direction (also see FIG. 2), and the rotor 12 includes two rotor modules 15 disposed axially one after the other in a rotationally fixed manner on the rotor shaft 13. Each stator module 14 is contained in a housing 16 made of magnetically nonconductive material, e.g. aluminum or plastic, which is composed of an outer, cup-shaped housing part 161 and an inner, disc-shaped housing part 162 (FIG. 5). As can be seen in FIG. 5 and particularly in FIG. 6, the two disc-shaped housing parts 162 of the two housings 16, each of which contains a stator module 14, rest directly against each other and are embraced by the two cup-shaped housing parts 161 of the housings 16, which rest against each other with their circular ring-shaped cup edges. Each housing part 161, 162 has a central opening 17 or 18; the central openings 17 of the two outer, cup-shaped housing parts 161 each accommodate a bearing plate 19 in which the rotor shaft 13 is supported in rotary fashion by means of a pivot bearing 20.

Figure 2:
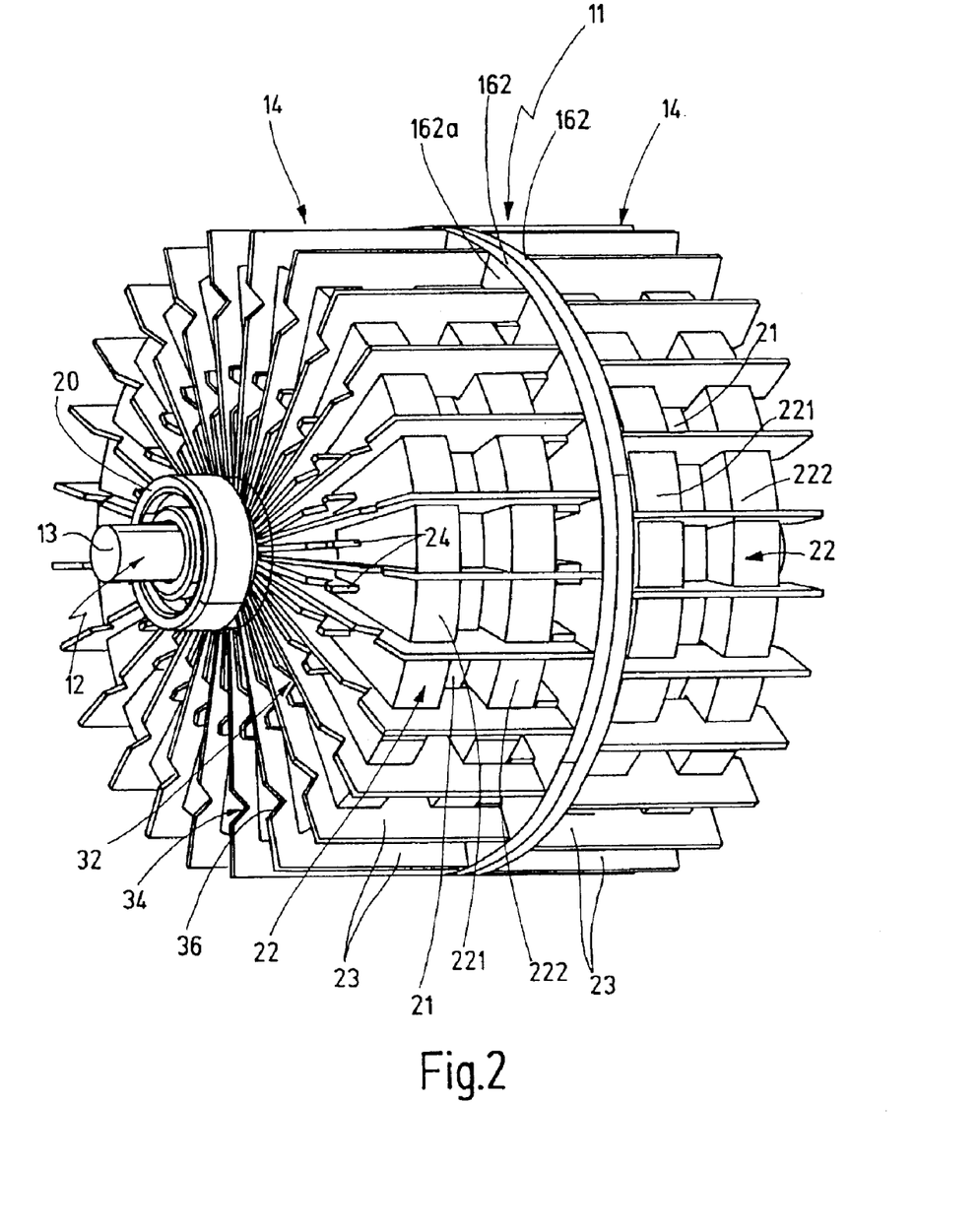
FIG. 2 is a perspective depiction of the two-strand transverse flux machine in FIG. 1, after the removal of the two cup-shaped housing parts of the housings of the stator modules.
Figure 3:
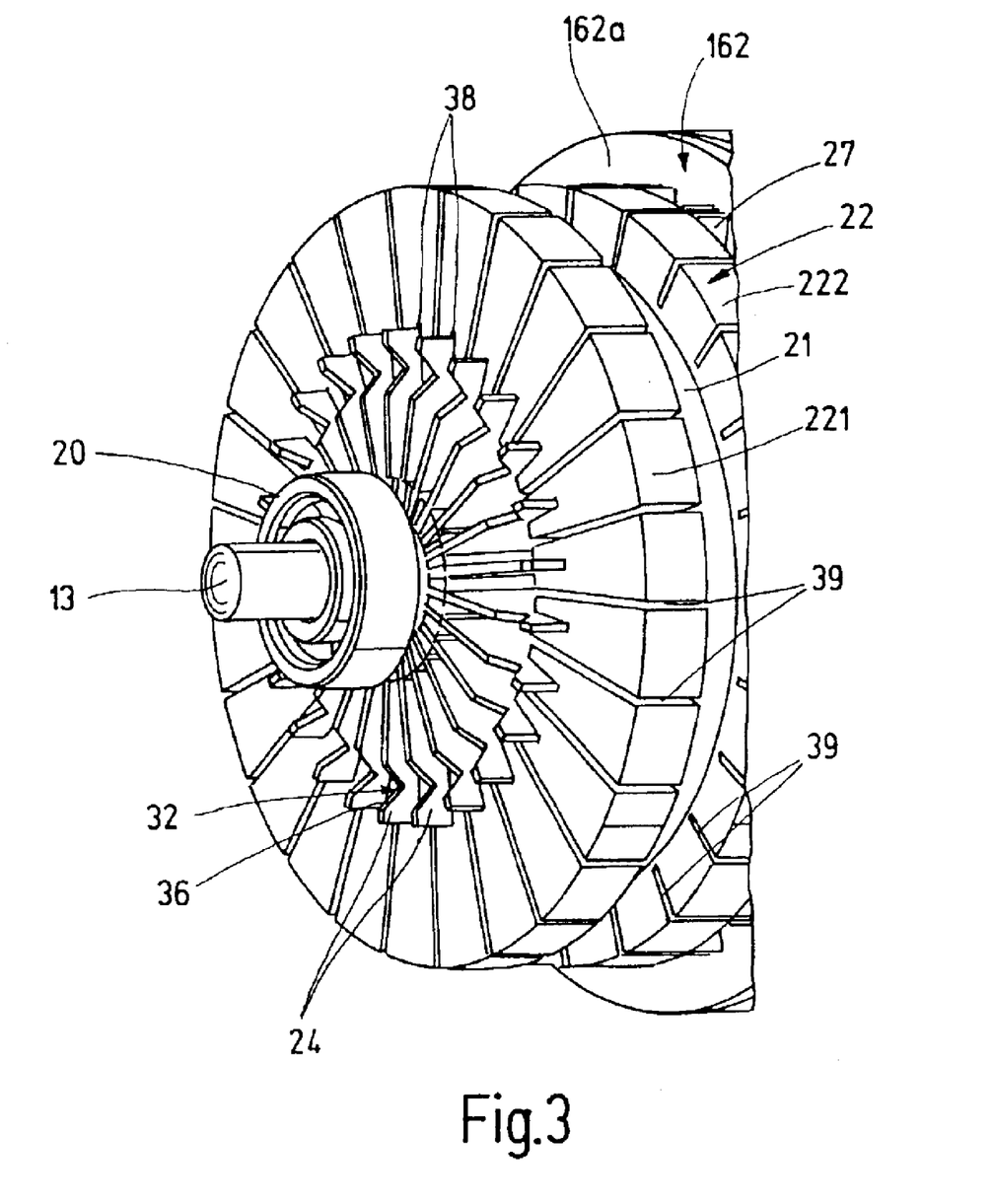
FIG. 3 shows a detail of the same depiction as FIG. 2, with the stator yokes removed.

The design of a stator module 14 is described in detail in DE 100 39 466 A1 and is therefore only discussed briefly here. The stator module 14 has an annular coil 21, which is disposed concentric to the axis of the stator, rotor, or housing and is contained in a coil body 22. The annular coil body 22 has a U-shaped cross section, whose U-opening points outward, i.e. is oriented toward the cup-shaped housing part 161. As depicted in FIGS. 1, 2, and 3, the coil body 22 has two parallel, annular legs 221 and 222 and an annular crosspiece 223 that is of one piece with these two legs and connects them together. The annular coil 21 is accommodated between the legs 221 and 222 and is wound onto the crosspiece 223. The coil body 22 with the annular coil 21 inside it is embraced from the outside by U-shaped stator yokes 23 that are disposed equidistantly in the circumference direction of the annular coil 21, while on the inner circumference of the coil body 22, stator fins 24 that are also equidistantly spaced span the coil body 22 in the axial direction. The distance of the stator yokes 23 from each other and the distance of the stator fins 24 from each other are the same, and the stator fins 24 are disposed rotated by half this distance in relation to the stator yokes 23. The stator yokes 23 and the stator fins 24 constitute the n stator poles of the transverse flux machine or the unipolar transverse flux machine, the spacing between the n/2 stator yokes 23 and the n/2 stator fins 24 corresponding to a pole pitch. The stator yokes 23 and stator fins 24 are shifted by half a pole pitch in relation to one another. Each stator yoke 23 and each stator fin 24 is comprised of a number of sheet metal laminations resting against one another.

The stator yokes 23 and the stator fins 24—referred to below jointly as stator elements—are disposed radially opposite from the rotor module 15, with a very small air gap 25 left between them (FIG. 6). The designs of the rotor module 15 of the transverse flux machine in FIG. 1 and the rotor module of the unipolar transverse flux machine according to FIG. 6 are not discussed in detail here because they are not relevant. In this connection, the reader is referred to Michael Bork, "Development and Optimization of a Production-Oriented Transverse Flux Machine" [Entwicklung und Optimierung einer fertigungsgerechten Transversalflußmaschine], Diss. 82, RWTH Aachen, Shaker Verlag, Aachen, 1997, p. 8 ff. for the transverse flux machine, and to DE 100 39 466 A1 for the unipolar transverse flux machine. In both machines, it is necessary that the air gap 25 between the stator module 14 and the rotor module 15 be as small as possible, thus requiring the stator elements 23, 24 to be positioned very precisely in the radial direction.

Figure 4:
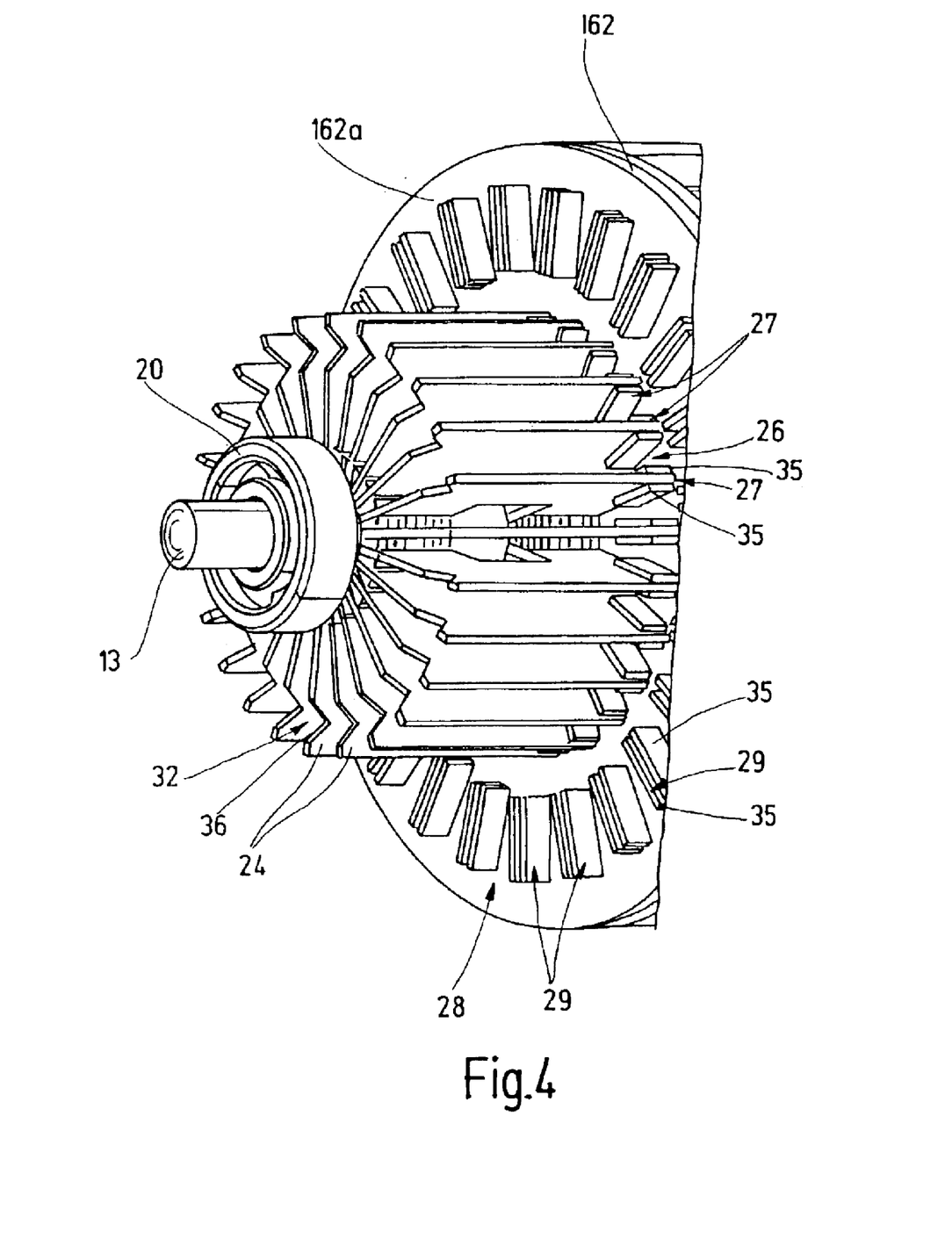
FIG. 4 shows the same depiction as in FIG. 3, with the annular coil removed.

For the sake of a simple production of the stator module 14 by means of joining techniques, which can be automated very easily, in each housing 16, the radially extending plane surfaces 161a and 162a of the two housing parts 161, 162 oriented toward each other are each provided with an inner row 26 of equidistantly disposed clamps 27 concentric to the housing axis and an outer row 28 of equidistantly disposed clamps 29 concentrically encompassing the first row 26 of clamps. Between the clamps 27 of the inner row 26, positioning elements 31 are provided, which correspond to positioning elements 32 embodied on the radially extending leading edges of the stator fins 24 in such a way that they secure the stator fins 24 in the radial direction. Between the clamps 29 of the outer row 28, positioning elements 33 are provided, which correspond to positioning elements 34 on the radially extending leading edges of the stator yokes 23 or their yoke legs in such a way that they radially secure the stator yokes 23 in the same fashion. As FIGS. 4 and 5 depict for the disc-shaped housing part 162, the clamps 27, 29 in the two rows 26, 28 are embodied identically and are each comprised of two retaining slats 35 that are spaced apart from each other and protrude axially from the plane surface 161a of the disc-shaped housing part 162, whose spacing is slightly greater than the thickness of the stator fins 24 and the stator yokes 23. The clamps 27, 29 on the plane surface 161a of the cup-shaped housing part 161 (FIGS. 1 and 6) that are not shown in FIGS. 2 to 5 are embodied identically to the clamps 27, 29 on the disc-shaped housing part 162. The positioning elements 32, 34 disposed on the stator elements, i.e. the stator fins 24 on the one hand and the stator yokes 23 on the other, are constituted by acute-angled notches 36 in the radially extending leading edges of the stator elements 24, 23, while the positioning elements 31, 33 disposed in the clamps 27, 29 are constituted by acute-angled protuberances 37 that extend between the retaining slats 35. As FIG. 4 shows only for the stator fins 24 in connection with the disc-shaped housing part 162, after the assembly of the stator module 14, the stator elements 24, 23 are positively engaged by the clamps 27, 29 and are fixed in a manner that prevents them from moving in the circumferential direction. At the same time, as shown in FIGS. 1 and 6, the positioning elements 31 and 32 on the one hand and 33 and 34 on the other, positively engage with one another so that a highly precise fixing of the stator elements 24, 23 in the radial direction is assured particularly if the stator fins 24 and stator yokes 23 are axially pressed against both of the housing parts by an axial joining force F exerted on the housing parts (FIG. 6).

In order to simplify the joining process of the stator elements 23, 24, the coil body 22 of the annular coil 21 is used to fix the position of the stator elements 23, 24 ahead of time in such a way that when the two housing parts 161, 162 are slid onto the prepositioned stator elements 23, 24, these elements 23, 24 are automatically inserted into the clamps 27, 29 in the two rows 26, 28 on each housing part 161, 162. To this end, the coil body 22 is provided with slots 38 for the insertion of the stator fins 24 and with slots 39 for the insertion of the stator yokes 23 (FIG. 3). The distance of the slots 38 and 39 from one another corresponds to the pole pitch, the slots 38 once again being shifted in the circumferential direction of the coil body 22 by one half pole pitch in relation to the slots 39. The slot width is designed to be slightly greater than the thickness of the stator fins 24 and stator yokes 23 so that these have a slight play when they are disposed in the slots 38, 39. Preferably, for each stator fin 24 or each stator yoke 23, a packet of sheet metal laminations is inserted into the slots 38 and slots 39, and these laminations are preferably not attached to one another in advance, but can also be press-bundled ahead of time. Depending on the form of the stator yokes 23 or the stator fins 24, the slots 39 extend along the annular legs 221, 222 and across the free, outer end surfaces of the legs 221, 222 of the coil body 22, while the slots 38 are let as axial slots into the annular crosspiece 223 of the coil body 22.

The assembly of the stator module 14 occurs with the simple joining technique of the stator elements 23, 24 in that first, the stator yokes 23 are inserted into the coil body 22 and then are slid with their one yoke leg into the clamps 29 of the outer second row 28 of one of the two housing parts, e.g. the disc-shaped housing part 162. Then the stator fins 24 are slid through the slots 38 into the clamps 27 of the inner row 26. Then the other housing part, e.g. the cup-shaped housing part 161, is slid onto the coil body 22 with the prepositioned stator elements 23, 24 so that the clamps 29 embrace the other yoke leg of the stator yokes 23 and the clamps 27 embrace the other radial leading edge of the stator fins 24, and the protuberances 37 between the clamps 29, 27 protrude into the notches 36 on the stator yokes 23 and stator fins 24. The second stator module 14 is assembled in the same manner. The two stator modules 14 are placed axially against each other in the correct position so that the housing axes are aligned with each other. The one housing 16 is possibly rotated by 90° electrically in relation to the other housing 16. Then the two outer, cup-shaped housing parts 161, which axially embrace the two inner, disc-shaped housing parts 162 and are oriented with their annular housing edges toward each other, are pressed together by means of an axial joining force F (FIG. 6), causing the stator elements 23, 24 to be pressed axially into the clamps 29, 27 and the protuberances 37 to be pressed with no tolerance into the notches 26. The joining force F is maintained while the two housing parts 161 are attached to each other, for example by means of laser welding or ultrasonic welding.

Naturally it is possible to embody the two disc-shaped housing parts 162 of the two housings 16 that each enclose a stator module 14, as being of one piece with each other. In this case, the clamps 27, 29 and the positioning elements 31 and 33 must be embodied on the two opposite planar disc surfaces of the disc-shaped housing part 162 that is shared by the two housings 16. If it is necessary for the stator modules 14 to be shifted by 90° electrically in relation to each other, then the clamps 27, 28 on the one disc surface of the shared housing part 162 must be disposed rotated by 90° in relation to the position of the clamps 27, 29 on the other disc surface. The assembly of such a two-strand transverse flux machine or unipolar transverse flux machine occurs in the same manner as described previously, in which first, the one stator module 14 is assembled and covered by the cup-shaped housing part 161 and then the second stator module 14 is assembled and covered by the second cup-shaped housing part 161, whereupon the two outer housing parts 161 are welded to each other during exertion of an axial joining force F on the two housing parts 161.

It is particularly advantageous if the strip conductors for electrically connecting the two annular coils 21 in the two stator modules 14 are routed between the two disc-shaped housing parts 162 that rest against each other or, in the case of the one-piece disc-shaped housing part 162 that is shared by the two housings 16, are routed inside the shared housing part 162. These strip conductors are preferably produced in the form of a stamped screen, which is either clamped between the two disc-shaped housing parts 162 or is cast into the shared disc-shaped housing part 162. The housing parts 161, 162 are made of plastic or aluminum, through the use of a molding or casting process.

The foregoing relates to preferred exemplary embodiments of the invention, it being understood that other variants and embodiments thereof are possible within the spirit and scope of the invention, the latter being defined by the appended claims.

We claim:

1. A unipolar transverse flux machine comprising
   at least one stator module (14) contained in a housing (16) composed of two axially joined housing parts (161, 162),
   an electrical annular coil (21) disposed concentric to the housing axis,
   stator elements (23, 24) axially spanning and extending radially to the annular coil (21) on the inside and outside,
   clamps (27, 29) disposed on the housing parts (161, 162) and at least partially embracing the stator elements (24, 23) laterally, and
   positioning elements (31–34) corresponding to one another provided in the clamps (27, 29) and in the stator elements (24, 23), the positioning elements securing the stator elements (24, 23) in the housing (16) in a radially stationary fashion.

2. The machine according to claim 1, wherein the housing parts (161, 162) comprise plane surfaces (161a, 162a) oriented toward each other, wherein the clamps (27, 29) protrude axially from the plane surface (161a, 162a) and wherein the radial leading edges of the stator elements (23, 24) are inserted into the clamps (29, 27).

3. The machine according to claim 2, wherein the clamps (27, 29) are disposed in two concentric rows (26, 28).

4. The machine according to claim 3, wherein the stator elements comprise equidistantly disposed stator yokes (23), which embrace the annular coil (21) from the outside, and equidistantly disposed stator fins (24), which axially span the annular coil (21) on the inside, and wherein the reciprocal spacing of the clamps (27, 29) in the two concentric rows (26, 28) corresponds to the reciprocal spacing of the stator fins (24) and to the reciprocal spacing of the stator yokes (23).

5. The machine according to claim 1, wherein the positioning elements (32, 34) provided on the stator elements (23, 24) are constituted by acute-angled notches (36) in the radial leading edges of the stator elements (24, 23) and the positioning elements (31, 33) provided in the clamps (27, 29) are constituted by acute-angled protuberances (37) that engage positively in the notches (36).

6. The machine according to claim 5, wherein the clamps (29, 27) embodied on the housing parts (161, 162) comprise two retaining slats (35) spaced apart from one another in the circumferential direction and protruding axially from the plane surface (161a, 162a) of the housing parts (161, 162), the spacing of the slots (35) being slightly greater than the thickness of the stator elements (23, 24), and wherein the acute-angled protuberances (37) each extend between the retaining slats (35) of each clamp (29, 27).

7. The machine according to claim 1, wherein the stator elements (23, 24) are axially clamped between the two housing parts (161, 162).

8. The machine according to claim 1, wherein the annular coil (21) is accommodated inside a coil body (22), and wherein the coil body (22) is provided with slots (39) for the insertion of the stator elements (23, 24), which slots are spaced apart from one another by a distance that corresponds to the spacing of the stator elements (23, 24) and have a slot width that is greater than the thickness of the stator elements (23, 24).

9. The machine according to claims 1, wherein each stator element (23, 24) comprises a number of laminations resting loosely against one another.

10. The machine according to claim 1, wherein the housing (16) is made of magnetically nonconductive material.

11. The machine according to claim 1, wherein one of the housing parts (161) is cup-shaped and the other housing part (162) is disc-shaped, and wherein each housing part (161, 162) contains a central opening (17, 18).

12. The machine according to claim 11, wherein the central openings (17) of the two cup-shaped housing parts (161) each accommodate a bearing plate (19) for a pivot bearing (20) of a rotor shaft (13).

13. The machine according to claim 11, wherein when two stator modules (14) with two housings (16) are disposed axially against each other, the two disc-shaped housing parts (162) rest against each other with their disc surfaces that are oriented away from the clamps (27, 29).

14. The machine according to claim 13, wherein the two cup-shaped housing parts (161) axially embrace the disc-shaped housing parts (162) resting against each other and rest with their circular ring-shaped cup edges against each other, and wherein the two cup-shaped housing parts (161) are attached to each other, preferably while an axial joining force is exerted on the housing parts (161).

15. The machine according to claim 14, wherein that the cup edges of the two cup-shaped housing parts (161) that rest against each other are welded to each other, e.g. by means of laser welding or ultrasonic welding.

16. The machine according to claim 13, wherein the clamps (27, 29) provided in the one housing (16) and the clamps (27, 29) provided in the other housing (16) are disposed rotated by 90° electrically in relation to each other.

17. The machine according to claim 16, wherein the two housings (16) are identically embodied and are secured to each other rotated by 90° electrically in relation to each other.

18. The machine according to claim 16, wherein the disc-shaped housing parts (162) of the two housings (16) that rest against each other are embodied of one piece with each other, and the clamps (27, 29) on the one disc surface of the disc-shaped housing part (162) shared by the two housings (16) are disposed rotated by 900 electrically in relation to the clamps (27, 29) on the other disc surface, and wherein the two cup-shaped housing parts (161) of the two housings (16) are embodied identically and are attached to each other rotated by 9020 electrically in relation to each other.

19. The machine according to claim 13, further comprising electric supply lines for the annular coils (21) of the two stator modules (14), the electric supply lines bring routed between the disc-shaped housing parts (162) of the two housings (16) resting against each other, each of which housings (16) contains a stator module (14).

20. The machine according to claim 19, wherein electric supply lines for the annular coils (21) of the two stator modules (14) are cast into the disc-shaped housing part (162) that is shared by the two housings (16).

21. The machine according to claim 19, wherein the electric supply lines are embodied in the form of a stamped screen (30).

* * * * *